(12) United States Patent
Recktenwald et al.

(10) Patent No.: US 10,882,478 B2
(45) Date of Patent: Jan. 5, 2021

(54) MOVEMENT-BASED COMFORT ADJUSTMENT

(71) Applicants: VOLKSWAGEN AG, Wolfsburg (DE); PORSCHE AG, Stuttgart (DE); BENTLEY MOTORS LIMITED, Cheshire (GB)

(72) Inventors: Benedict A. Recktenwald, Sunnyvale, TX (US); David Irving, Chester (GB)

(73) Assignees: VOLKSWAGEN AG, Wolfsburg (DE); PORSCHE AG, Stuttgart (DE); BENTLEY MOTORS LIMITED, Cheshire (GB)

( * ) Notice: Subject to any disclaimer, the term of this patent is extended or adjusted under 35 U.S.C. 154(b) by 2 days.

(21) Appl. No.: 16/223,166

(22) Filed: Dec. 18, 2018

(65) Prior Publication Data
US 2020/0189500 A1   Jun. 18, 2020

(51) Int. Cl.
*B60N 2/02*     (2006.01)
*B60R 16/037*   (2006.01)
*G06K 9/00*     (2006.01)

(52) U.S. Cl.
CPC .......... *B60R 16/037* (2013.01); *B60N 2/0248* (2013.01); *G06K 9/00369* (2013.01); *G06K 9/00791* (2013.01); *G06K 9/00832* (2013.01); *B60N 2002/0268* (2013.01)

(58) Field of Classification Search
CPC .............. B60R 16/037; B60N 2/0248; B60N 2002/0268; G06K 9/00369; G06K 9/0079; G06K 9/00832

USPC .......................................................... 701/36
See application file for complete search history.

(56) References Cited

U.S. PATENT DOCUMENTS

| | | |
|---|---|---|
| 9,082,239 B2 | 7/2015 | Ricci |
| 9,707,912 B1 | 7/2017 | Pena Casimiro et al. |
| 2009/0127906 A1* | 5/2009 | Sugiyama .............. B60N 2/666 297/284.4 |
| 2012/0053794 A1* | 3/2012 | Alcazar ................ B60N 2/0244 701/48 |
| 2014/0309806 A1* | 10/2014 | Ricci ...................... G06Q 10/02 701/1 |
| 2014/0353937 A1* | 12/2014 | Girelli Consolaro .. B60G 11/22 280/124.128 |
| 2016/0325650 A1* | 11/2016 | Furukawa .............. B60N 2/757 |
| 2016/0368509 A1* | 12/2016 | Uppal .................... B60K 35/00 |
| 2017/0009509 A1* | 1/2017 | Ryu .................... B60R 25/2045 |
| 2017/0251979 A1* | 9/2017 | Franz .................... B60N 2/0244 |
| 2018/0022246 A1* | 1/2018 | Patrick ................. B60N 2/0232 297/284.3 |
| 2019/0126934 A1* | 5/2019 | Wellborn ................ H04W 4/44 |

FOREIGN PATENT DOCUMENTS

| DE | 102016013894 A1 | 5/2017 |
|---|---|---|
| GB | 2539467 A | 12/2016 |

* cited by examiner

*Primary Examiner* — Behrang Badii
*Assistant Examiner* — Hossam M Abd El Latif
(74) *Attorney, Agent, or Firm* — Barnes & Thornburg LLP (57) ABSTRACT

Devices, systems, and methodologies for providing a comfort system of a transportation vehicle include capturing and assessing movement data of a user. The movement data can include movement data captured upon the user's approach to the transportation vehicle.

17 Claims, 5 Drawing Sheets

MOVEMENT-BASED COMFORT ADJUSTMENT

FIELD

The present disclosure relates to devices, systems, and methodologies of transportation vehicles. In particular, the present disclosure relates to devices, systems, and methodologies for transportation vehicle features having comfort and/or safety aspects.

SUMMARY

In accordance with disclosed embodiments, a comfort system for a transportation vehicle is provided.

In accordance with disclosed embodiments the comfort system may include a movement acquisition system including at least one data sensor for capturing movement data of the vehicle user; a comfort controller including a processor for executing instructions stored by at least one memory device to determine adjusted comfort settings based on the captured movement of the vehicle user.

In accordance with disclosed embodiments the comfort system may include a comfort actuation system for adaptive configuration of transportation vehicle parameters for user comfort. The comfort actuation system may include at least one actuator having at least two operational states.

In accordance with disclosed embodiments, the at least one actuator may be adapted for selective operation within the at least two operational states based on the adjusted comfort settings.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Configuration of vehicle features to provide preferred ergonomics and/or comfort can promote a user's general enjoyment of the transportation vehicle, and can encourage safe and/or recommended arrangement of vehicle features relative to the user. For example, arrangement of vehicle parameters such as seat position and/or shape, steering controls position and/or orientation, safety feature position and/or orientation, and/or infotainment controls position and/or orientation relative to the user, can promote ease and/or safety in operation of the transportation vehicle.

However, there remains a technical problem unmet by conventional technology in that appropriate arrangement of vehicle parameters may not, and often does not, remain stagnant, even for a particular user. For example, at any given time, and over any given period of time, a user's skeletal-muscular conditions may manifest any one or more of physical ailments, psychophysical ailments, and/or variation in the user's particular conditions, which may influence the nature of the user's comfort. These conditions and variations may be manifest as indicated by the user's movement. Therefore, disclosed embodiments provide technical utility by assessing a user's movement to assist in predicting and accommodating preferred configuration of vehicle parameters for the user's comfort and/or safety in an automated basis to some level.

In some embodiments, the adjusted comfort settings may be determined based on a comparison between known data of the user and the captured movement of the user. Known data of the user may include movement of the user previously stored.

In some embodiments, the at least one actuator may include one or more actuators selected from the group comprising: a seat position actuator, a seat contour actuator, navigation control interface position actuator, and a seat therapy actuator. Adaptive configuration may include adjusting the one or more selected seat position actuator, seat contour actuator, navigation control interface position actuator, and initializing the seat therapy actuator to preform therapy, according to the deviant comfort settings.

In some embodiments, the at least one data sensor may include a video camera. The video camera may be arranged to capture movement of the vehicle user upon approaching from outside the transportation vehicle. The comfort controller may include a remote server providing other information for use in determining the deviant comfort settings. The other information may include at least one of historical user movement information and medical data.

In some embodiments, the comfort controller may determine a skeletal-muscular movement deviation profile based on comparison of the captured movement to known user movement. The comfort controller may determine the deviant comfort settings based on the skeletal-muscular movement deviation profile. The captured movement may indicate at least one of the user's gait, stride, and reach.

According to another aspect of the present disclosure, a transportation vehicle may include a vehicle chassis, and a comfort system including a movement acquisition system for capturing movement of a vehicle user. The movement acquisition system may include at least one data sensor supported by the vehicle chassis for capturing movement data of the vehicle user. The transportation vehicle may include a comfort controller including a processor for executing instructions stored by at least one memory device to determine adjusted comfort settings based on the captured movement of the vehicle user, and a comfort actuation system for adaptive configuration for user comfort. The comfort actuation system may include at least one actuator having at least two operational states. The at least one actuator may be adapted for selective operation within the at least two operational states based on the adjusted comfort settings.

In some embodiments, the adjusted comfort settings may be determined based on a comparison between known movement of the user and the captured movement of the user. Known movement of the user may include movement of the user previously stored.

In some embodiments, the at least one actuator may include one or more actuators selected from the group comprising: a seat position actuator, a seat contour actuator, navigation control interface position actuator, and a seat therapy actuator. Adaptive configuration may include adjusting the one or more selected seat position actuator, seat contour actuator, navigation control interface position actuator, and initializing the seat therapy actuator to preform therapy, according to the deviant comfort settings.

In some embodiments, the at least one data sensor may include a video camera. The video camera may be arranged to capture movement of the vehicle user upon approaching from outside the transportation vehicle. The comfort controller may include a remote server providing other information for use in determining the deviant comfort settings. The other information may include at least one of historical user movement information and medical data.

In some embodiments, the comfort controller may determine a skeletal-muscular movement deviation profile based on comparison of the captured movement to known user movement. The comfort controller may determine the deviant comfort settings based on the skeletal-muscular movement deviation profile. The capture movement may indicate at least one of gait, stride, and reach the user.

According to another aspect of the present disclosure, a method of adjusting comfort parameters of a transportation vehicle may include capturing movement data of a vehicle user approaching the transportation vehicle, determining adjusted comfort settings based on the captured movement of the vehicle user, and selectively operating a comfort actuation system of the transportation vehicle based on the adjusted comfort settings. In some embodiments, the adjusted comfort settings may be determined based on a comparison between known movement of the user and the captured movement of the user.

Additional features of the present disclosure will become apparent to those skilled in the art upon consideration of illustrative embodiments exemplifying the best mode of carrying out the disclosure as presently perceived.

Figure 1:
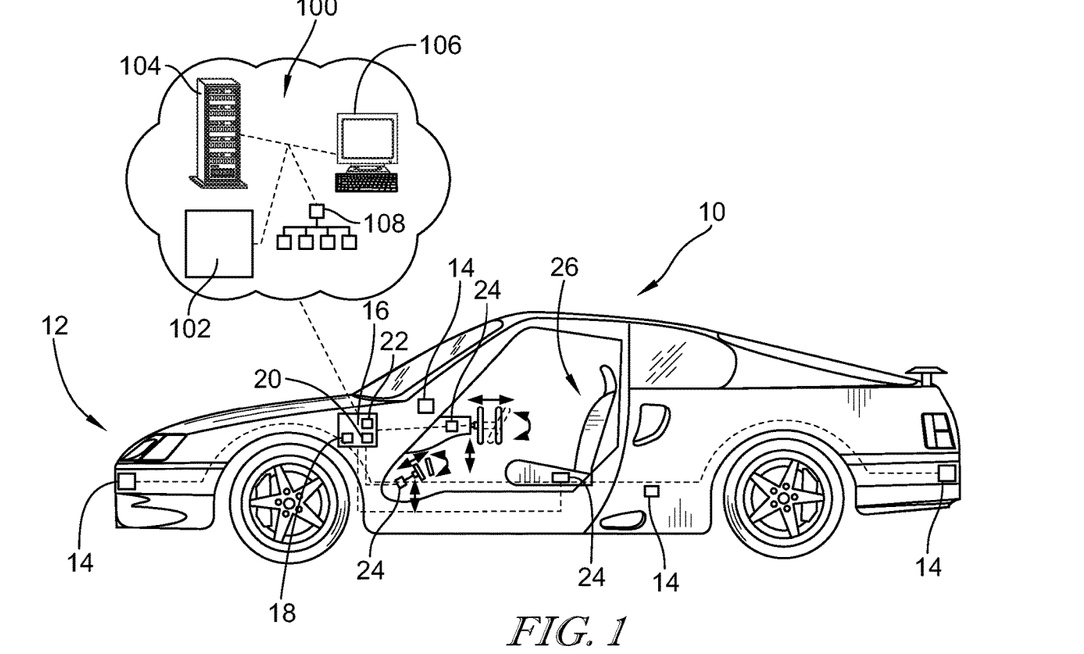
FIG. 1 is an elevation view of a transportation vehicle including a movement acquisition system having data sensors for capturing a user's movement to determine comfort settings.

Referring to FIG. 1, a transportation vehicle 10 is shown which may include a data acquisition system 12. The data acquisition system 12 may include data sensors 14 for capturing movement of a vehicle user. By assessment of the user's movement, a characteristic movement profile may be determined to provide preferred comfort settings for the user.

Figure 2:
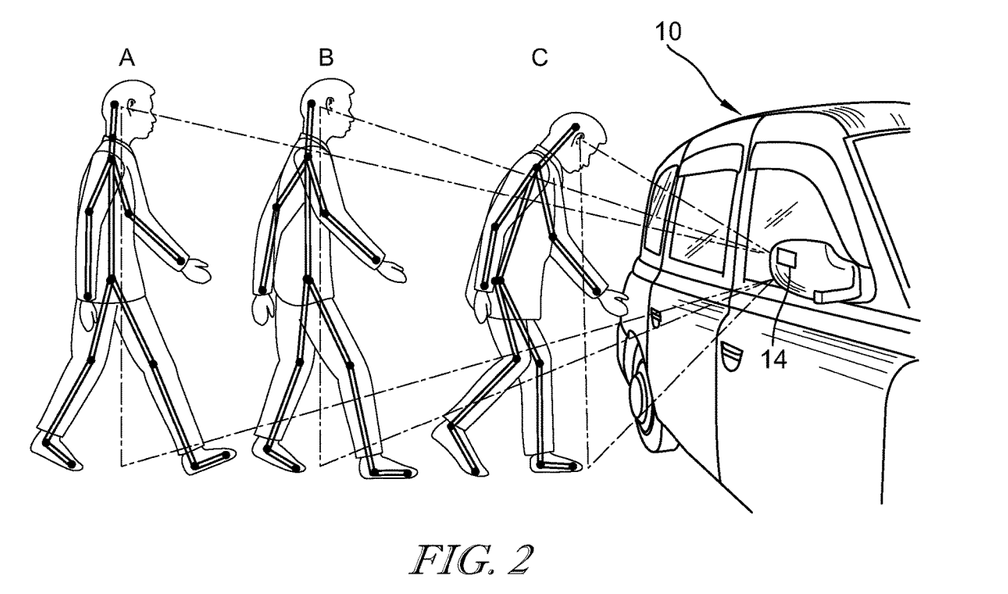
FIG. 2 is a perspective view of the transportation vehicle of FIG. 1 showing that the movement acquisition system may capture the user's movement on approach to the transportation vehicle.

Referring to FIG. 2, an exemplary data sensor 14 may be mounted to the chassis of the transportation vehicle to capture movement of the user as the user approaches the transportation vehicle 10. From the captured movement, a characteristic movement profile of the user may be determined. For example, the manner of the user's gait in walking from position A to position B, may indicate slouching or other gait anomalies. Additionally, the user's approach to the transportation vehicle 10 between position B and position C while operating ingress features may indicate muscular-skeletal factors, for example, the manner of the user's reach for the door may indicate shortened reach and/or stiffness.

The data sensors 14 may be embodied as video cameras arranged to capture the user's movement. The data sensors 14 may be mounted to the exterior of the transportation vehicle 10 to capture approach movement of the user. In some embodiments, the sensors 14 may include any suitable manner of data capture device, such as low light (night vision) cameras, thermal imaging devices such as infrared cameras, radar, LIDAR, sonar, and/or other data collection systems.

Figure 3:
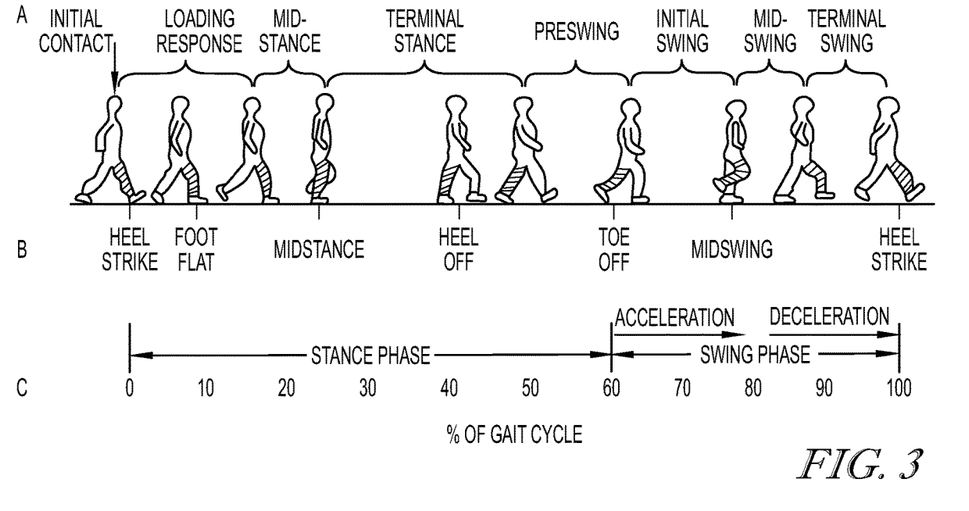
FIG. 3 is a diagrammatic view of the representation of human gait sequence indicating various phases of human gait that may be used to determine anomalies in the capture movement of the user.

Referring to FIG. 3, human gait cycle can be defined by a sequence of movements. These movements can include heel strike, foot flat, mid-stance, heel off, toe off, mid-swing, and subsequent heel strike. Assessment of a user's gait can reveal specific conditions which can be accommodated for comfort within the transportation vehicle 10. For example, deviations in position timing, comparison of the stages of gait (loading response, mid-stance, terminal stance, pre-swing, initial swing, mid-swing, and/or terminal swing), comparison of the gait phases (stance phase and swing phase) can indicate the location of pain or stiffness in the user's body.

Figure 4A:
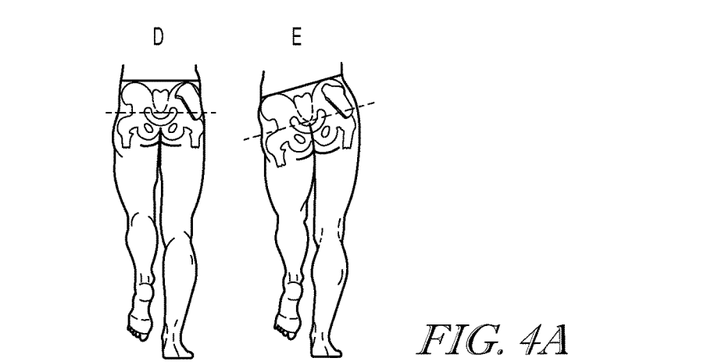
FIG. 4A is a diagrammatic posterior view of human's lower quarters illustrating an example of gait and/or posture anomalies.
Figure 4B:
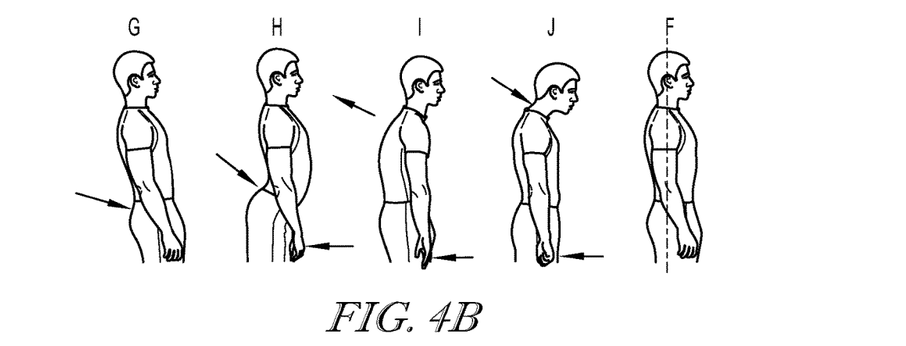
FIG. 4B is diagrammatic posterior view of human's torso section illustrating other examples of gait and/or posture anomalies.

Referring to FIG. 4A, skeletal positions during movement can indicate physical conditions. For example, pelvic drop (tilt), as shown in position E in comparison to preferred position D, during stride can indicate soreness and/or weakness in major muscle groups. Similarly, as shown in FIG. 4B, posture deviations can indicate skeletal-muscular issues. For example, deviations from a preferred posture indicated as position F to non-preferred positions, such as sway back G, lumbar lordosis H, thoracic kyphosis I, and/or forward head J, can be detected within the user's movement.

Returning to FIG. 1, a controller 16 may be arranged to receive the captured movement data from the data sensors 14 and to determine comfort settings based on the movement data. The controller 16 may include a processor 18 adapted to execute instructions stored on a memory device 20 based on the received movement data to determine comfort settings, and to provide comfort commands based on the comfort settings via communication circuitry 22. The controller 16 may provide comfort commands to arrange parameters of the transportation vehicle to enhance the user's comfort and/or safety.

The controller 16 may communicate with a remote server network 100. The remote server network 100 may include databases 102, servers 104, terminals 106, and/or network connections 108 for conducting network server operations. The controller 16 may receive indication of known user data from the remote server network 100. The known user data may include previously captured movement information of the user, however, in some embodiments, may include any of personal health data (e.g., medical history), statistical information pertaining to the user's demographic (e.g., health and/or conditioning factors related to age, height, weight, location, etc.), and/or other information relevant to the user's movement, comfort, and/or safety. The controller 16 may perform comparison of the known user data with the captured movement data to determine a skeletal-muscular movement deviation profile of the user as a representation of the current skeletal-muscular movement of the user including deviations from the known movement of the user, from which the comfort settings can be determined. In some embodiments, the controller 16 may capture and store the known user data directly, and/or may send indication of captured movement data to the remote server network 100 for determination of the skeletal-muscular movement deviation profile and/or the comfort settings for communication to the controller 16.

The controller 16 may communicate with features of the transportation vehicle 10 to provide preferred arrangement based on the comfort settings. The controller 16 may communicate commands to actuators 24 to provide preferred arrangement of vehicle features between operational states. The actuators 24 may include navigation control actuators such as steering wheel position and/or orientation actuators, foot pedal position and/or orientation actuators, and/or seat position and/or orientation actuators.

By example, a foot pedal position and/or orientation actuator may be operated to adjust the vertical position, horizontal position, reach, and/or angle of the foot pedals relative to the user, wherein a first position and/or orientation of a foot pedal forms a first operational state and a second position and/or orientation of the foot pedal forms a second operational state different from the first operational state.

By further example, a steering wheel position and/or orientation actuator may be operated to adjust the position including the vertical position (vertical direction in FIG. 1), lateral position (direction into the page in FIG. 1), and/or reach (left-right direction in FIG. 1); and/or to adjust the orientation including the angle (e.g., vertical and/or lateral tilt angle in FIG. 1) of the steering wheel relative to the user. In some embodiments, safety features such as seat belts (e.g., shoulder loop, hip latch, and/or retractor) and/or airbags (front and/or side), and/or infotainment features such as display screens and/or user interfaces may each include actuators 24 in communication with the controller 16 for similar position and/or orientation adjustment based on the comfort settings.

Figure 5:
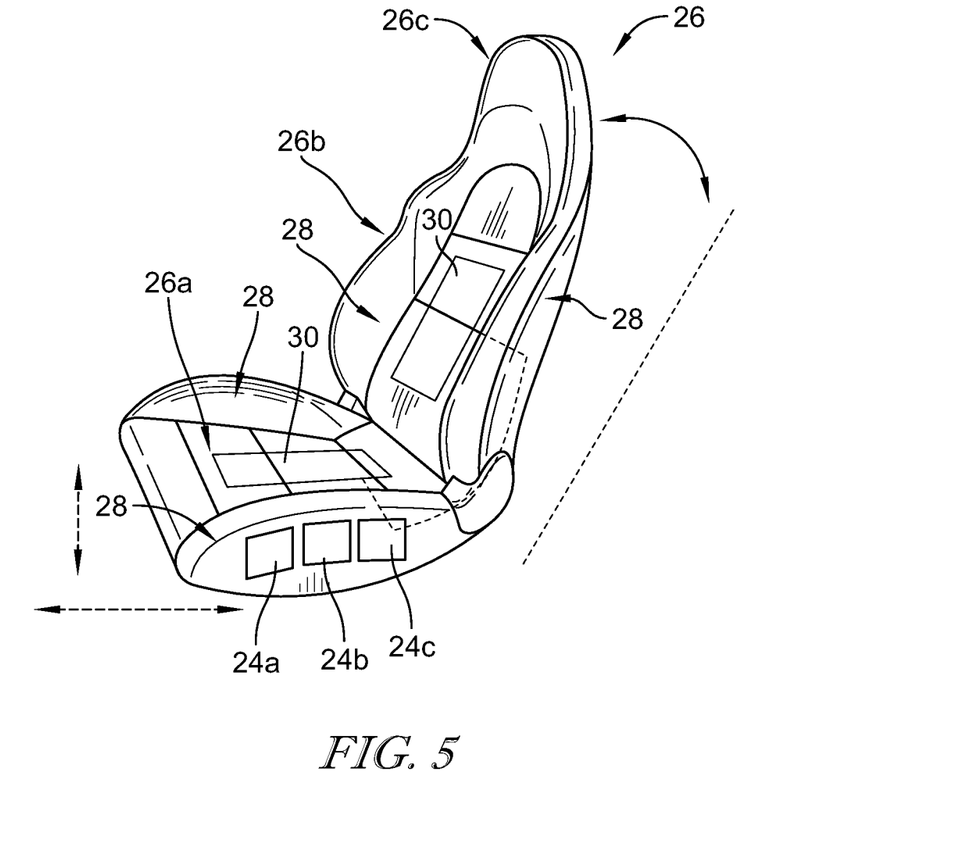
FIG. 5 is a perspective view of a seat of the vehicle of FIG. 1 indicating that actuators may be activated to have operational states according to the comfort settings, and showing that the operational states may include position and/or orientation of seat portions and/or actuation of therapy features.

As shown in FIG. 5, a seat 26 of the transportation vehicle 10 may include actuators 24a, 24b, 24c for actuation to adjust seat parameters. The actuator 24a may be configured to adjust seat position and/or orientation including vertical position (vertical direction in FIG. 6), lateral position (direction into the page in FIG. 6), reach (left-right direction in FIG. 6); and/or to adjust the orientation including the angle (e.g., vertical and/or lateral tilt angle in FIG. 6) of the seat base 26a, backrest 26b, and/or headrest 26c. The actuator 24b may be configured to adjust seat contouring such as by adjusting the fill of fluid bolsters within the seat to adjust firmness and/or shape and/or size of the seat base 26a, backrest 26b, and/or headrest 26c. For example, the size and/or shape of the lumbar section of the backrest 26b and/or the size and/or shape of the sidewings 28 of either the seat base 26a and/or backrest 26b may be adjusted by the actuator 24b.

The actuator 24c may be configured to adjust the operational state of therapy features. For example, the actuator 24c may be configured to adjust therapy devices 30 of the seat 26 between about 0 and about 100% of operation intensity. The therapy devices 30 may be embodied as heating and/or cooling devices, massage therapy devices, and/or other therapeutic treatment systems disposed in the seat 26 and operable between operational states based on the comfort settings for user enjoyment. In some embodiments, therapy devices 30 may include features disposed outside the seat 26, for example, heating and/or cooling devices of the cabin and/or steering wheel.

Figure 6:
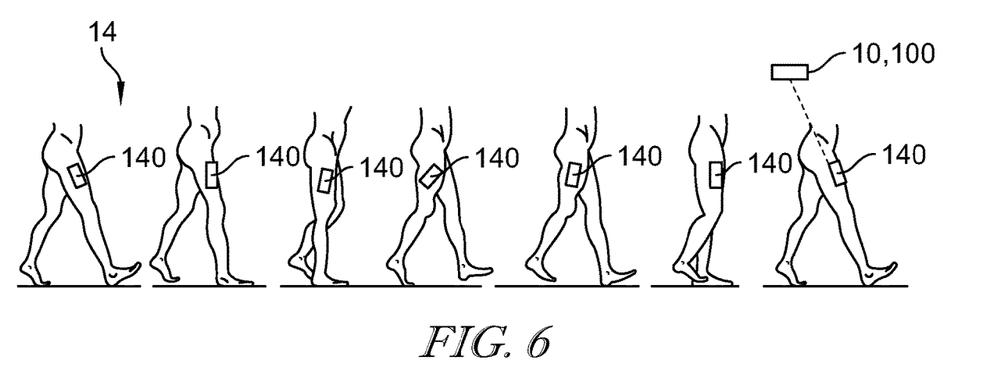
FIG. 6 is a diagrammatic view of a human gait sequence indicating that the person is carrying a mobile device in a pants pocket such that the mobile device can act as a data sensor of the movement acquisition system to capture movement data of the user for communicating to determine the comfort settings.

Referring to FIG. 6, a user's mobile device 140 may form an effective data sensor 14 for capturing motion of the user. For example, the user carrying the mobile device 140 in a pocket may capture motion data corresponding to the user's gait and/or stride using the mobile device's built-in sensors such as cameras, microphones, gyroscopes, proximity sensors, NFC, GPS, rotation sensors, and/or accelerometers. The mobile device 140 may communicate the captured motion data wirelessly to the transportation vehicle 10 and/or to the remote server network 100 for consideration in determining the skeletal-muscular movement deviation profile and/or the comfort settings.

Figure 7:
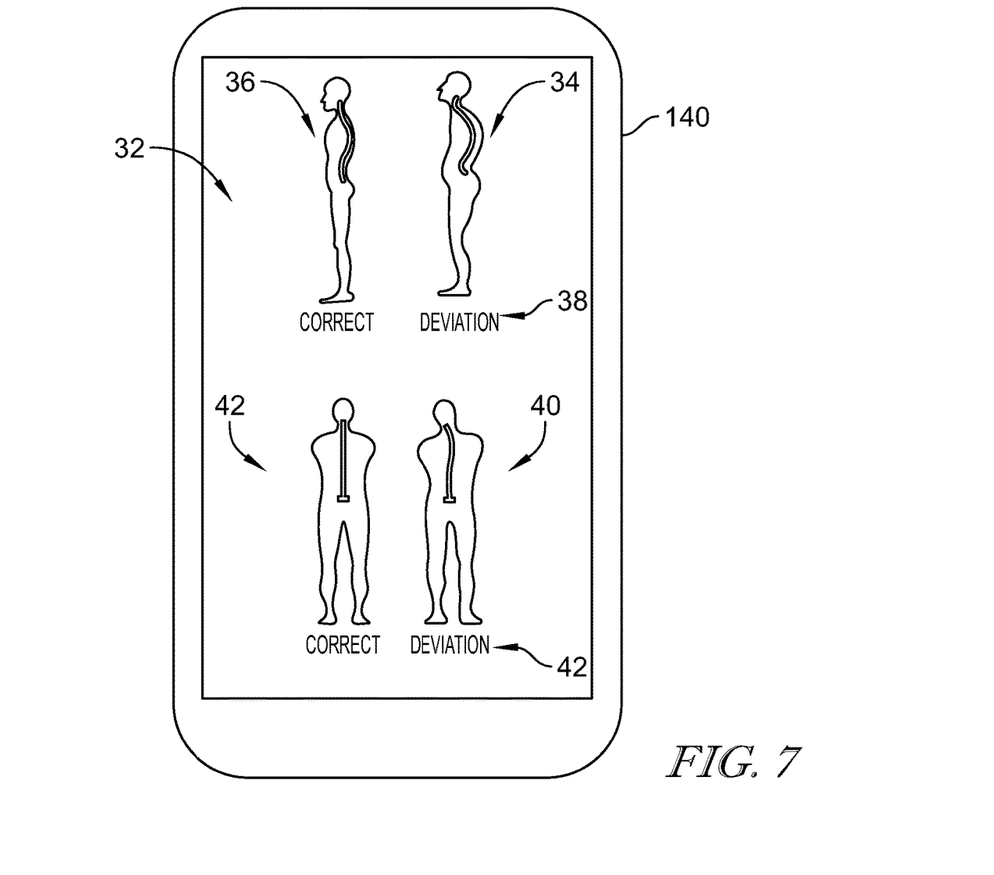
FIG. 7 is an elevation view of the mobile device showing that a display screen may provide a graphical representation of a skeletal-muscular movement profile of the user as determined based on the captured movement data.

As shown in FIG. 7, the controller 16 and/or remote server network 100 may communicate with the mobile device 140 to provide user information about the determined skeletal-muscular movement deviation profile. The user information may include a graphical representation 32 of the skeletal-muscular movement deviation profile for display on the screen of the mobile device 140. For example, the graphical representation may include an image of a lateral deviation posture 34 corresponding to the skeletal-muscular movement deviation profile of the user. The graphical representation 32 may include a lateral preferred position 36 for comparison to the lateral deviation posture 34, and/or textual labeling 38 to inform the user of the difference in graphics. The graphical representation 32 may include other preferred positions such as a posterior deviation posture 40, and may be presented for comparison with a preferred posterior posture 42 and/or textual labeling 42. The graphical representation 32 may be presented as a feature of a resident application of the mobile device 140 and may provide access features to the user for example, historical record function, comfort settings options for selection, and/or authorization controls for enabling communication of known user data from the remote server network 100.

Figure 8:
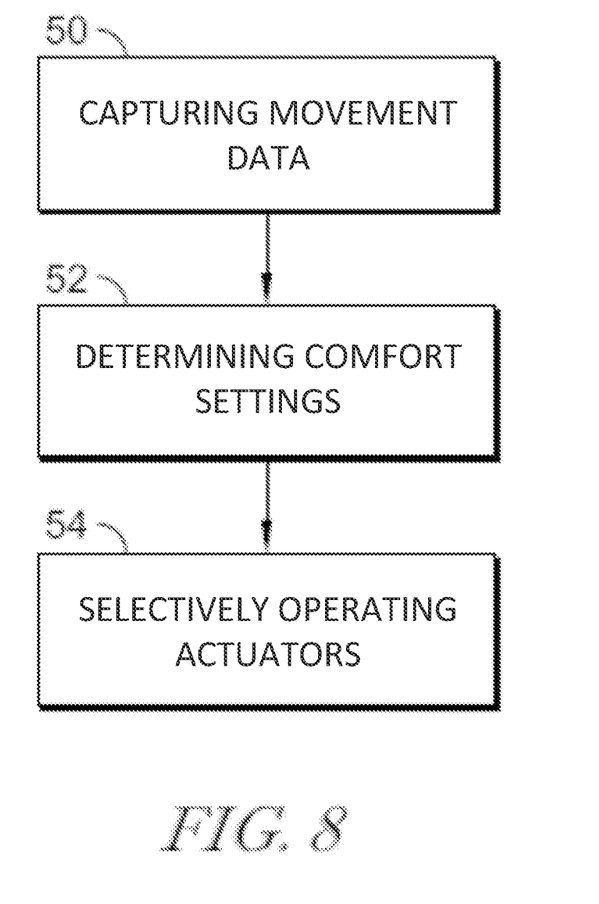
FIG. 8 is a flow diagram indicating that a process may include capture of movement data, determination of comfort settings based on the movement data, and selective actuation of transportation vehicle features based on the comfort settings.

Referring to FIG. 8, a process may include capturing movement data 50 regarding a user, determining comfort settings 52, and selectively operating actuators to achieve the comfort settings 54. Capturing movement data 50 may include capturing movement data from data sensors 14 regarding a user. Determining comfort settings 52 may include determining the skeletal-muscular movement deviation profile of the user based on the captured movement data and determining comfort settings based on the skeletal-muscular movement deviation profile. Determining the skeletal-muscular movement deviation profile of the user based on the captured movement data may include comparing the captured movement data to known user data. In some embodiments, determining comfort settings 52 may include communicating with the remote server network 100. Selectively operating actuators to achieve the comfort settings 54 may include operating actuators 24 of the transportation vehicle 10 to achieve desired operational state(s) according to the comfort settings.

The present disclosure includes devices, systems, and methods for adjusting vehicle parameters for comfort and/or safety based on assessment of user movement. Selective operation of vehicle actuators between operational states may include automation such as full, partial, and/or user-initiated automation. Adjusting vehicle comfort and/or safety systems automatically based on human condition detection using video assessment of gait, limp, upper body movement, etc. can provide ease and/or assurance of achieving comfort and/or safety to the user.

For medical applications, using video assessment of individuals and their movement may allow diagnosis/pre-diagnosis of certain health issues. In wellness, there may be certain comfort and/or safety topics that can be used to help mitigate and/or soften certain health issues. Combining these two topics can be implemented into a video assessment assisting in the improvement of comfort and/or safety by creating customized vehicle settings, such as seating settings, reach to the steering wheel and pedals, and/or massage programs that can be optimized to make someone more comfortable in the vehicle based on data gathered from video assessment.

Within the present disclosure, having detailed base measurement of an occupants body and/or movement, algorithm(s) may be sourced from health and/or wellness supplier(s) to assess the current condition of an individual by taking a view of the occupants current movement to detect certain differences such as gait, limp, posture, strain, reach, etc. Using this assessment the onboard or off-board (connected vehicle) system can take a delta condition and determine what may improve comfort and/or safety in regards to seating position, steering wheel positions, and pedal position to increase occupant comfort in a number of ways, including increasing/reducing reach to steering wheel/pedals, adding/removing support to certain points on the body such as back/legs based on gait/limp/posture/strain/reach assessment, increasing/decreasing bolster/lumbar support based on gait/limp/posture/strain/reach assessment, optimizing massage profile based on gait/limp/posture/strain/reach assessment, creating a custom massage profile based on gait/limp/posture/strain/reach assessment, etc.

In some embodiments, machine learning techniques may be applied to develop skeletal-muscular deviant profiles and/or comfort settings. Using machine learning and/or use history, the system may be enabled to begin to recognize different movement patterns and subsequent user requests for comfort features such as seat heating, cooling, massage, distance to pedals, distance to wheel, and other associated comfort settings. As used herein comfort setting may include safety settings. This may then be assessed across multiple vehicles to determine ideals for individuals as well as general rules for default measures.

Devices, systems, and methods within the present disclosure may allow for video recognition of differences in gait, stride, reach, movement, posture, etc. to help determine the condition of the occupant and adjust the comfort and/or safety features for preferred comfort and/or safety considering the conditions. For example, if an occupant has a reduced reach and/or stride, potentially moving the seat closer to the steering wheel and pedals to decrease reach during driving might assist in a more comfortable and/or safe driving position. Video capture and/or movement asset may provide enhanced ability to conform comfort settings.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

We claim:

1. A comfort system for a transportation vehicle comprising: a movement acquisition system including at least one data sensor for capturing user movement, including movement data of the transportation vehicle user upon approaching from outside the transportation vehicle; a comfort controller including a processor for executing instructions stored by at least one memory device to determine adjusted comfort settings based on the captured movement of the vehicle user, and a means for comfort actuation system for adaptive configuration of transportation vehicle parameters for user comfort, wherein the comfort actuation system comprises at least one actuator including at least two operational states, and the at least one actuator is selectively operable between the at least two operational states based on the determined adjusted comfort settings of the comfort controller, wherein the comfort controller determines a skeletal-muscular movement deviation profile based on comparison of the captured user movement to known user movement and the comfort controller determines the deviant comfort settings based on the skeletal-muscular movement deviation profile, and wherein the comfort controller communicates a signal to the comfort actuation system to selective operate between the at least two operational states based on the determined deviant comfort settings.

2. The comfort system of claim 1, wherein known data of the user includes movement of the user previously stored.

3. The comfort system of claim 1, wherein the at least one actuator includes one or more actuators selected from the group comprising: a seat position actuator, a seat contour actuator, navigation control interface position actuator, and a seat therapy actuator.

4. The comfort system of claim 3, wherein adaptive configuration includes adjusting the one or more selected seat position actuator, seat contour actuator, navigation control interface position actuator, and initializing the seat therapy actuator to preform therapy, according to the deviant comfort settings.

5. The comfort system of claim 1, wherein the at least one data sensor includes a video camera.

6. The comfort system of claim 1, wherein the comfort controller includes a remote server providing other information for use in determining the deviant comfort settings.

7. The comfort system of claim 6, wherein the other information includes at least one of historical user movement information and medical data.

8. The comfort system of claim 1, wherein the capture movement indicates at least one gait, stride, and reach of the user.

9. A transportation vehicle comprising: a vehicle chassis, and a comfort system including a movement acquisition system for capturing movement of a vehicle user, including user movement upon approaching from outside the transportation vehicle, the movement acquisition system including at least one data sensor supported by the vehicle chassis for capturing movement data of the vehicle user, a comfort controller including a processor for executing instructions stored by at least one memory device to determine adjusted comfort settings based on the captured movement of the vehicle user, and a comfort actuation system for adaptive configuration for user comfort, the comfort actuation system including at least one actuator having at least two operational states and adapted for selective operation within the at least two operational states based on the adjusted comfort settings, wherein the comfort controller determines a skeletal-muscular movement deviation profile based on comparison of the captured user movement to known user movement and the comfort controller determines the deviant comfort settings based on the skeletal-muscular movement deviation profile, and wherein the comfort controller communicates a signal to the comfort actuation system to selective operate between the at least two operational states based on the determined deviant comfort settings.

10. The transportation vehicle of claim 9, wherein known data of the user includes movement of the user previously stored.

11. The transportation vehicle of claim 9, wherein the at least one actuator includes one or more actuators selected from the group comprising: a seat position actuator, a seat contour actuator, navigation control interface position actuator, and a seat therapy actuator.

12. The transportation vehicle of claim 11, wherein adaptive configuration includes adjusting the one or more selected seat position actuator, seat contour actuator, navigation control interface position actuator, and initializing the seat therapy actuator to preform therapy, according to the deviant comfort settings.

13. The transportation vehicle of claim 9, wherein the at least one data sensor includes a video camera.

14. The transportation vehicle of claim 9, wherein the comfort controller includes a remote server providing other information for use in determining the deviant comfort settings.

15. The transportation vehicle of claim 14, wherein the other information includes at least one of historical user movement information and medical data.

16. The transportation vehicle of claim 9, wherein the captured movement indicates at least one gait, stride, and reach of the user.

17. A method of adjusting comfort parameters of a transportation vehicle, the method comprising: capturing movement data of a vehicle user approaching from outside the transportation vehicle, determining adjusted comfort settings based on the captured movement of the transportation vehicle user, including determining a skeletal-muscular movement deviation profile based on comparison of the captured user movement to known user movement, and determining the deviant comfort settings based on the skeletal-muscular movement deviation profile, and communicating a control signal selectively operating a comfort actuation system of the transportation vehicle between at least two operational states based on the adjusted comfort settings.

* * * * *